(12) United States Patent
Reeth, II et al.

(10) Patent No.: US 7,797,211 B1
(45) Date of Patent: Sep. 14, 2010

(54) METHOD AND SYSTEM FOR AN ENHANCED PAYROLL REPORT

(75) Inventors: Kevin M. Reeth, II, San Jose, CA (US); Terry Hicks, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 172 days.

(21) Appl. No.: 11/496,998

(22) Filed: Jul. 31, 2006

(51) Int. Cl.
G06Q 40/00 (2006.01)

(52) U.S. Cl. .................................. 705/35; 705/36 T

(58) Field of Classification Search .............. 705/35–42
See application file for complete search history.

(56) References Cited

U.S. PATENT DOCUMENTS

| | | | | |
|---|---|---|---|---|
| 5,600,554 A * | 2/1997 | Williams | ................... | 705/320 |
| 6,041,313 A * | 3/2000 | Gilbert et al. | ............. | 705/36 R |
| 6,401,079 B1 * | 6/2002 | Kahn et al. | ................... | 705/30 |
| 6,411,938 B1 * | 6/2002 | Gates et al. | ................... | 705/30 |
| 6,437,306 B1 * | 8/2002 | Melen | ..................... | 250/208.1 |
| 7,089,200 B2 * | 8/2006 | Bode | ........................... | 705/32 |
| 7,299,013 B2 * | 11/2007 | Rotta et al. | ............. | 455/67.16 |
| 7,398,238 B1 * | 7/2008 | Calce et al. | ................... | 705/30 |
| 2001/0034676 A1 * | 10/2001 | Vasic | ......................... | 705/30 |
| 2002/0035527 A1 * | 3/2002 | Corrin | ....................... | 705/35 |
| 2002/0184148 A1 * | 12/2002 | Kahn et al. | .................. | 705/40 |
| 2003/0018557 A1 * | 1/2003 | Gilbert et al. | ................. | 705/36 |
| 2004/0049436 A1 * | 3/2004 | Brand et al. | .................. | 705/30 |
| 2005/0027652 A1 * | 2/2005 | Reeves et al. | ................. | 705/39 |
| 2006/0155632 A1 * | 7/2006 | Cherkas et al. | .......... | 705/36 R |
| 2007/0055592 A1 * | 3/2007 | Vu | ............................. | 705/32 |
| 2007/0168274 A1 * | 7/2007 | Taylor | ..................... | 705/36 T |

OTHER PUBLICATIONS

"Scudder Defined Contribution Services Launches Paycheck Calculator Retirement Savings Diskette", Business Editors. Business Wire. New York: Feb. 17, 1998 p. 1.*
"ADP, Sovereign Bank Partner Up to Offer Transaction Processing Services", FinancialWire. Forest Hills: Apr. 19, 2006. p. 1.*
"Paycheck Introduces Health Savings Account Product" Business Wire. New York: Dec. 12, 2005. p. 1.*
"Scudder Defiined Contribution Services Launches Paycheck Calculator Retirement Savings Diskette", Business Editors. Business Wire. New York: Feb. 17, 1998 p. 1.*
Riccardo A Davis, "Employee Self-Service Takes Off", Accounting Technology. Boston: Mar. 2005. vol. 21, Iss. 2; p. 32, 5 pgs.*

* cited by examiner

*Primary Examiner*—Ella Colbert
*Assistant Examiner*—Mohammad Z Shaikh
(74) *Attorney, Agent, or Firm*—Osha • Liang LLP

(57) ABSTRACT

A method for creating an enhanced payroll report, involving accessing payroll information associated with at least one line item on a paycheck, and generating a payroll report including financial impact information, wherein the financial impact information is associated with the at least one line item, and wherein the payroll report is provided to an employee for a current pay period.

24 Claims, 5 Drawing Sheets

Pay Stub 400

Check #: 2
Check Date: 02/03/2006
Pay Period: 01/21/2006 - 02/03/2006

Pay to the Order of:

Amount: $365.77

Three hundred sixty-five and 77/100 ************************************

Address

Memo:
The Memo appears on employee paychecks. Hint: The pay period dates are also included.

| Compensation 402 | | | | |
|---|---|---|---|---|
| Compensation Types | Quantity | Rate | Current Amount | YTD Amount |
| Hourly | 25:00 | 20.00 | 500.00 | 1000.00 |
| | | Total | $500.00 | |

| Pre-Tax Deductions 404 | | | | |
|---|---|---|---|---|
| Deductions | Quantity | Rate | Current Amount | YTD Amount |
| 401(k) | | | 50.00 | 50.00 |
| Medical Care FSA | | | 20.00 | 20.00 |
| | | Total | $70.00 | |

| Employee-Paid Taxes 406 | | |
|---|---|---|
| Taxes | Current Amount | YTD Amount |
| Federal Income Tax | 20.00 | 47.00 |
| Medicare | 6.96 | 14.21 |
| Social Security | 29.76 | 60.76 |
| CA - Income Tax | 3.67 | 8.74 |
| CA - Disability | 3.84 | 7.84 |
| Total | $64.23 | |

| Company-Paid Taxes 410 | | |
|---|---|---|
| Taxes | Current Amount | YTD Amount |
| Medicare Company | 6.96 | 14.21 |
| Social Security Company | 29.76 | 60.76 |
| Federal Unemployment | 3.84 | 7.84 |
| CA - Unemployment | 16.32 | 33.32 |
| CA - Employment Training Tax | 0.48 | 0.98 |
| Total | $57.36 | |

| Net Pay 408 |
|---|
| Total: $365.77 |
| Tax savings: Your pre-tax deductions for this period have saved... |
| $7.00 in federal income tax |
| $1.40 in CA income tax |
| $1.53 in Social Security and Medicare contributions |
| $9.93 Total tax obligations |

Tax Savings 412

*FIGURE 4*

METHOD AND SYSTEM FOR AN ENHANCED PAYROLL REPORT

BACKGROUND

A pay stub is a document that an employee typically receives either as a notice of a direct deposit transaction into the employee's financial account, or as part of the printed version of a paycheck, which is delivered to the employee. Typically a pay stub details an employee's gross income and all taxes and any other deductions, such as retirement plan contributions, insurances, garnishments, or charitable contributions, taken out of the gross income. A pay stub also includes the employee's net income (i.e., income after deductions). The aforementioned financial information included on a pay stub is typically included in two amounts: the amount for a current pay period, and the year-to-date amount. Thus, for example, a pay stub includes the social security deductions taken for a current pay period and a year-to-date amount that indicates the total amount of social security deductions taken so far in a calendar year. In addition, a pay stub may include other details, such as the amount of vacation time an employee has accrued thus far in the year and the pay period dates. The financial information included on a pay stub is typically calculated by a payroll software or service provider used by the employer. The payroll software includes equations, tables, etc., that are used to calculate the financial information seen on a typical pay stub.

Conventionally, the deductions taken out of the employee's gross income can be categorized as pre-tax deductions and post-tax deductions. Pre-tax deductions are deductions that are taken out of the employee's gross income before income tax is applied to the employee's income. For example, retirement plan contributions, health insurance premiums, and medical deductions, such as disability insurance premiums and dependant care benefits, are typically pre-tax deductions. Post-tax deductions include deductions taken out of the employee's gross income after income tax is applied to the employee's income. Post-tax deductions typically include social security tax, employee stock purchase plan deductions, etc.

SUMMARY

In general, in one aspect, the invention relates to a method for creating an enhanced payroll report, comprising accessing payroll information associated with at least one line item on a paycheck, and generating a payroll report comprising financial impact information, wherein the financial impact information is associated with the at least one line item, and wherein the payroll report is provided to an employee for a current pay period.

In general, in one aspect, the invention relates to a system for generating a payroll report, comprising a payroll data input unit configured to receive payroll information from the payroll data input unit, wherein the payroll information is associated with at least one line item of a paycheck of and employee, and a payroll report generator operatively connected to the payroll data input unit configured to generate a payroll report using the payroll information, wherein the payroll report comprises financial impact information associated with the least one line item, wherein the payroll report generator comprises a payroll engine configured to perform calculations included in the financial impact information.

In general, in one aspect, the invention relates to a data structure, comprising a first element comprising at least one line item associated with a paycheck, and a second element comprising financial impact information associated with the at least one line item, wherein the first element and the second element are displayed on a payroll report.

In general, in one aspect, the invention relates to a computer system for creating an enhanced payroll report comprising a processor, a memory, a storage device, and software instructions stored in the memory for enabling the computer system under control of the processor, to access payroll information associated with at least one line item on a paycheck, and generate a payroll report comprising financial impact information, wherein the financial impact information is associated with the at least one line item, and wherein the payroll report is provided to an employee for a current pay period.

In general, in one aspect, the invention relates to a computer readable medium comprising instructions to perform a method for creating an enhanced payroll report, comprising accessing payroll information associated with at least one line item on a paycheck, and generating a payroll report comprising financial impact information, wherein the financial impact information is associated with the at least one line item, wherein the payroll report is provided to an employee for a current pay period.

Other aspects of the invention will be apparent from the following description and the appended claims.

BRIEF DESCRIPTION OF DRAWINGS

FIG. 4 shows an example of an enhanced pay stub in accordance with one embodiment of the invention.

DETAILED DESCRIPTION

Figure 1:
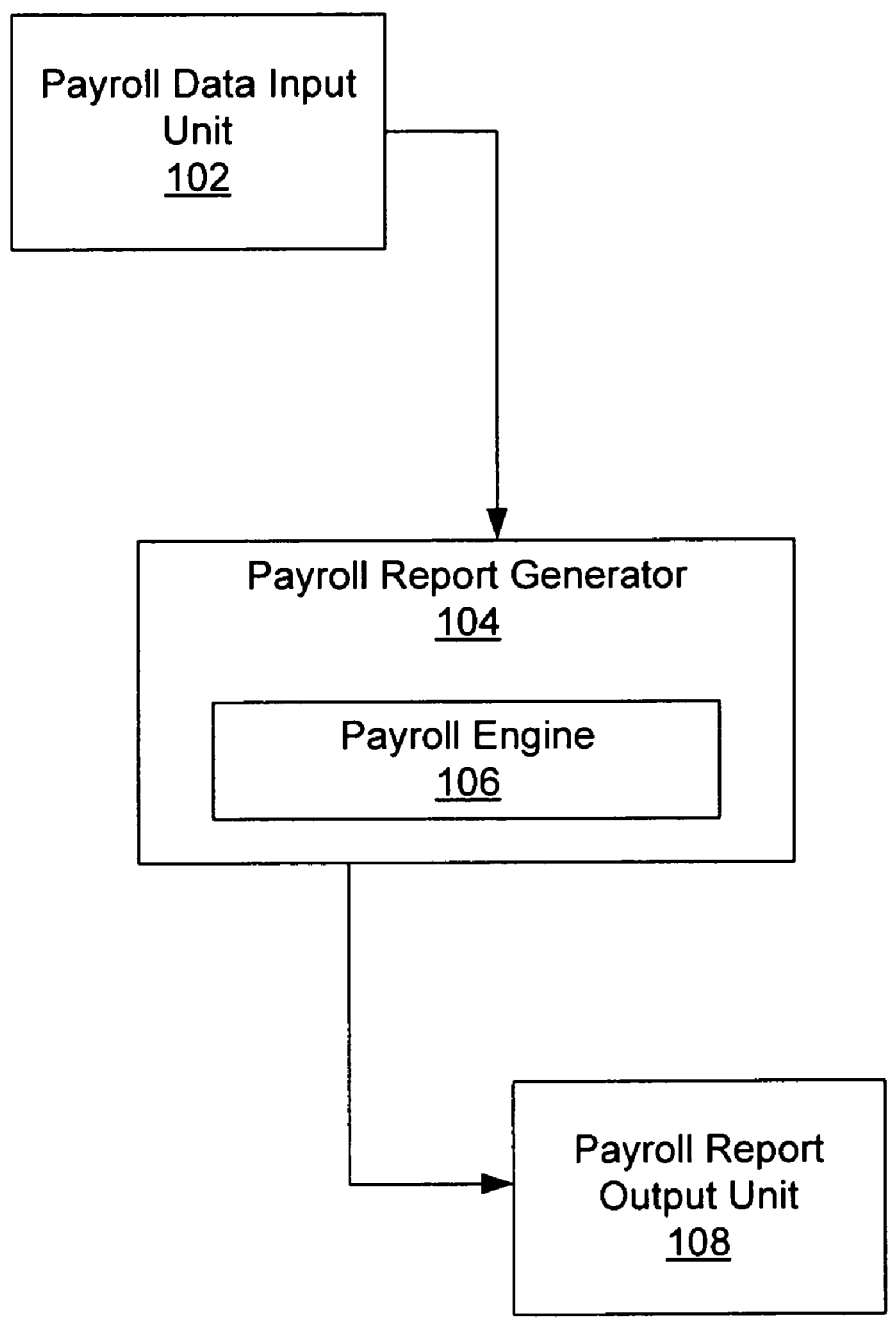
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention are directed toward a system and method for creating and using enhanced payroll reports. Specifically, embodiments of the invention relate to generating an enhanced payroll report that includes financial impact information. Embodiments of the invention are further directed toward using the financial impact information provided on payroll reports to manage cash flow, modify payroll settings that affect line items on a paycheck, and/or specify payroll elections.

FIG. 1 shows a system in accordance with one embodiment of the invention. Specifically, FIG. 1 shows a payroll data input unit (102) and payroll report generator (104) including a payroll engine (106) and a payroll report output unit (108). Each of the aforementioned components of FIG. 1 is explained below.

In one embodiment of the invention, the system shown in FIG. 1 is used to generate enhanced payroll reports that include financial impact information. Financial impact information may be information that has an impact on an employee's financial state or increases awareness of an employee's financial state. For example, in one or more embodiments of the invention, financial impact information may include tax savings information, information providing a relationship between particular pre-tax and/or post-tax deduction amounts and a calendar year limit on the pre-tax and/or post-tax deduction amounts, recommendations for selecting particular payroll elections and financial advantages of selecting the recommended payroll elections, links to providers associated with line items on a paycheck, information advising of expected changes in the amount of net pay an employee receives, and other information associated with one or more line items on a paycheck that has a financial impact for an employee. More specific examples of financial impact information are provided below. Those skilled in the art will appreciate that the aforementioned examples of financial impact information is not an exhaustive list, and is not meant to limit the invention in any way.

Turning to FIG. 1, the payroll data input unit is configured to receive payroll data associated with one or more employees. Specifically, in one embodiment of the invention, payroll data may include data associated with one or more line items of an employee paycheck. Line items on an employee paycheck may include any information that is provided on a paycheck or used to calculate an employee's net income. For example, payroll data may include an employee's gross income, which may be a salary amount or an hourly rate, one or more payroll elections made by an employee, tax information (i.e., employee paid taxes, company paid taxes, post-tax deductions, etc.), and any other information that reduces an employee's gross income to result in the employee's net income.

In one embodiment of the invention, payroll data may be received by the payroll data input unit (102) via manual entry. For example, an employer or an employee may manually enter payroll data into the payroll data input unit (102) using a computing device, such as a desktop computer, a laptop, a mobile phone, a personal digital assistant, etc. Alternatively, payroll data may be pulled from one or more external sources. For example, the payroll data input unit (102) may be linked to a financial software, a web-based application, a third party provider of payroll services or information, or other information source(s) that contains payroll data associated with one or more employees. In this embodiment, the payroll data input unit (102) may be configured to pull the payroll data from the financial software and/or the web-based application.

Continuing with FIG. 1, the payroll data input unit (102) is operatively connected to a payroll report generator (104). The payroll report generator (104) includes functionality to generate payroll reports. In one or more embodiments of the invention, a payroll report may be an employee paycheck, a pay stub associated with an employee paycheck, a tax form (e.g., a W2 form), or any other report containing paycheck line item detail communicated to an employee.

In one embodiment of the invention, the payroll report generator (104) includes a payroll engine (106). The payroll engine (106) is the entity responsible for performing paycheck withholding and tax calculation functions. More specifically, the payroll engine includes functionality to perform calculations using payroll data, where the results of the calculations are displayed on one or more payroll reports generated by the payroll report generator (104). Further, in one embodiment of the invention, the payroll engine includes functionality to perform calculations and/or gather information that is used to provide financial impact information on generated payroll reports. Calculations performed by the payroll engine (106) may include, for example, calculating the amount of tax paid by an employee, calculating the net income of an employee per pay period after subtracting pre-tax and post-tax deductions, comparing a pre-tax/post-tax deduction amount with a calendar year limit associated with the line item, calculating tax savings associated with pre-tax deductions elected by an employee, calculating an out-of-pocket amount associated with a line item that is paid by an employee in view of tax savings associated with the line item, a recommendation for an employee to elect a particular payroll election, etc. Further, the payroll engine (106) may include tables, equations, etc., that are used to perform one or more of the aforementioned calculations using payroll data.

Those skilled in the art will appreciate that the payroll engine may be external to the payroll report generator. Thus, in one or more embodiments of the invention, a third party may provide payroll engine services. Further, those skilled in the art will appreciate that the payroll report generator may include functionality to perform payroll calculations and/or gather information that is used to provide financial impact information on generated payroll reports.

Those skilled in the art will appreciate that payroll software capable of performing calculations with payroll data and the manner in which such calculations are performed is well known in the art. Further, those skilled in the art will appreciate that the aforementioned examples of calculations that may be performed by the payroll engine are not exhaustive, and are not meant to limit the invention in any way.

In one embodiment of the invention, the payroll report generator (104) is operatively connected to a payroll report output unit (108). The payroll report output unit (108) includes functionality to output the payroll reports generated by the payroll report generator (104), where the payroll reports display the financial impact information. In one or more embodiments of the invention, the payroll report may be a physical document (i.e., a hard copy) that is delivered to an employee. In this case, the payroll report output unit (108) may be a printer that includes functionality to print the payroll report. Alternatively, in one embodiment of the invention, the payroll report may be an electronic report displayed on a website, a webpage, or sent via electronic mail to an employee. In this case, the payroll report output unit may be a computer or similar device capable of displaying the payroll report including the financial impact information in electronic form.

In one embodiment of the invention, the line items associated with a paycheck, various payroll data, and the financial impact information may be displayed on a payroll report in multiple formats. For example, the line items and financial impact information may be displayed in a table, in a list format, or in any other data structure. Further, in one embodiment of the invention, the payroll report itself may be a data structure (i.e., if the payroll report is an electronic report) that stores line items, payroll data, and financial impact information that is displayed to an employee.

Figure 2:
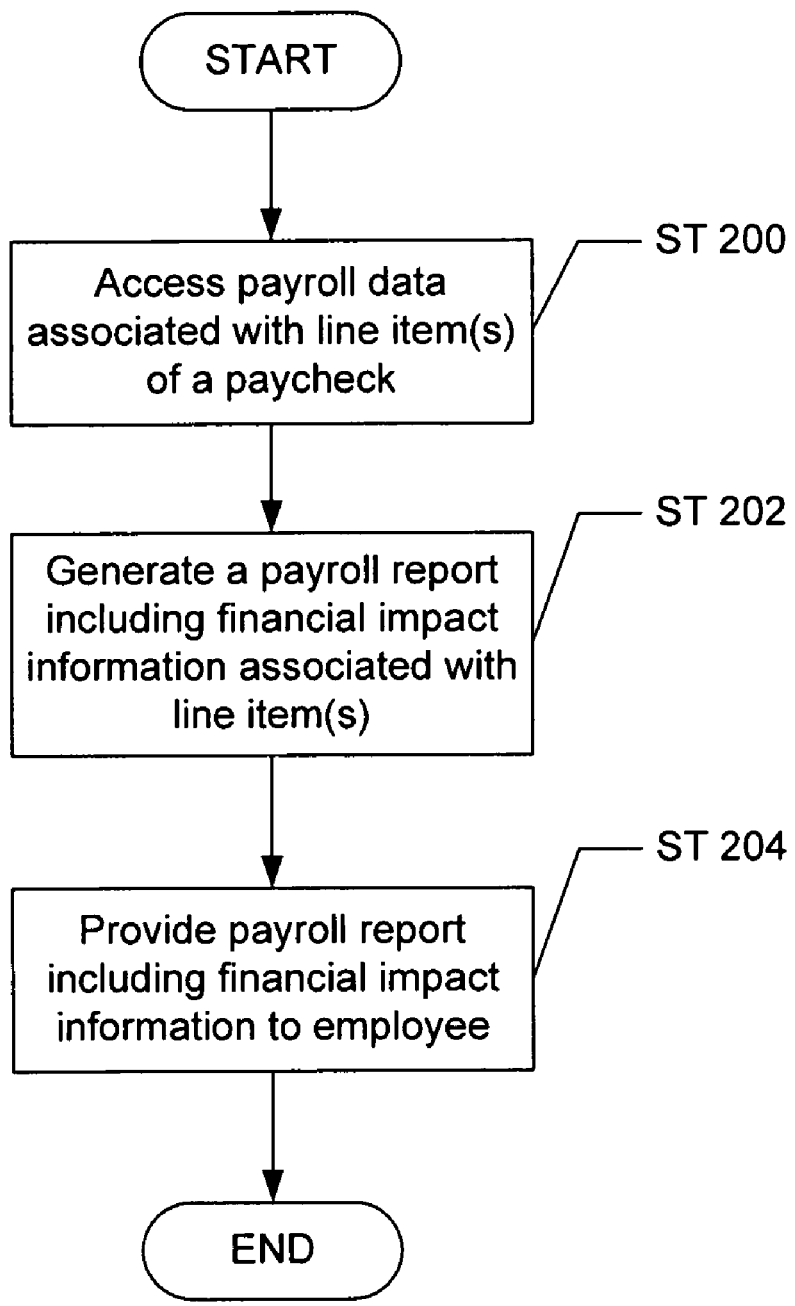
FIG. 2 shows a flow chart for creating an enhanced payroll report in accordance with one or more embodiments of the invention.

FIG. 2 shows a flow chart for creating an enhanced payroll report including financial impact information in accordance with one embodiment of the invention. Initially, payroll data associated with one more line items of a paycheck is accessed (Step 200). For example, payroll data may be accessed by an employer, by the payroll engine, or by an entity associated with the payroll engine. Subsequently, a payroll report including the financial impact information associated with the one or more line items of the paycheck is generated (Step 202).

As described above, the financial impact information is obtained using the payroll data associated with a particular employee and performing calculations to determine the impact of each line item of a paycheck on the employee's overall financial state. The payroll report including the financial impact information is then provided to an employee with whom the payroll data used to calculate the financial impact information is associated (Step 204). Thus, in one embodiment of the invention, the financial impact information is provided to an employee at the time of delivery of the payroll report. Alternatively, in one embodiment of the invention, the financial impact information may be generated along with the payroll report, but is provided to the employee separately (or at a different time) upon request of the employee. For example, the financial impact information may be generated in a separate document, which may be provided to the employee via electronic mail, via a secured web page, or using other communication means. Further, in one embodiment of the invention, the payroll report may be provided to the employer in addition to the employee.

As described above, financial impact information may be information that is provided in addition to the typical financial information provided on a payroll report. More specifically, financial impact information is financial information that has an impact on an employee's financial state or increases awareness of an employee's financial state. Said another way, financial impact information provides an understanding of how an employee's gross income is disbursed among all options available to an employee, including tax line items. Further, by providing the employee with the financial impact information within or along with the generated payroll report, the employee is able see a direct connection between line items on the employee's paycheck and the impact that changes to each of the line items has on the employee's current and potential financial state. The following paragraphs illustrate examples of including financial impact information on payroll reports as described in the method of FIG. 2.

In one embodiment of the invention, financial impact information may be associated with pre-tax deductions, post-tax deductions, and other line items in a paycheck. For example, a payroll report may include a calendar year limit on social security payments, which are post-tax payments made by an employee. In one embodiment of the invention, for high income employees who may reach the social security calendar year limit, a payroll report may include information that provides the employee with an exact pay period during which the employee reaches the calendar year social security limit and detail the increase in the amount of net income that the employee experiences upon reaching the social security calendar year limit. This financial impact information associated with such a post-tax deduction may subsequently be used to manage cash flow, make investment or other financial decisions, etc.

In another example, consider the scenario in which an employer provides employees with an employee stock purchase plan (ESPP). An ESPP allows an employee to purchase employer stock at a discount rate and after a certain period of time, the employee can sell the purchased stock for a profit, if the sale price of the stock remains above the discounted purchase price. To contribute to an ESPP, the employee's gross income is reduced by an elected amount each pay period, where the reduction in gross income is post-tax. In this scenario, financial impact information provided to an eligible employee on a payroll report may include the discount rate at which the eligible employee can purchase employer stock and the number of shares that the eligible employee would obtain by contributing a certain amount of money to the ESPP. Further, the financial impact information may include an estimated amount of money that the employee would make by selling the stock at a time when the purchased stock can be sold. In this manner, the employee is educated regarding the ESPP and can make an informed decision regarding whether to participate in the ESPP. Those skilled in the art will appreciate that the aforementioned example of financial impact information associated with an ESPP provides benefits for both an employee and an employer.

As described above, payroll reports may be any document generated by a payroll report generator and that includes an employee's payroll data. For example, a payroll report may be a W2 form that an employer is required to generate and submit to the Internal Revenue Service (IRS). A W2 form details an employee's payroll data (as mandated by the IRS) for the previous calendar year. In one embodiment of the invention, an employee may be provided with an auxiliary W2 form that includes financial impact information. For example, the auxiliary W2 form may be a web-based electronic form or may be electronically mailed to the employee. Alternatively, a hard copy of the auxiliary W2 form that includes the financial impact information may be provided to an employee. In this example, financial impact information may include information that contains an analysis of the W2 form. More particularly, the auxiliary W2 form may include the relationship between particular payroll settings and the calendar year limit imposed for the payroll settings, recommendations on how to maximize tax savings for the upcoming calendar year, etc.

Further, in one or more embodiments of the invention, financial impact information may include information associated with external entities that desire to educate or persuade an employee to use the external entities' services. For example, suppose payroll services exist that may be integrated with online banking. In this case, the bank may advertise a high interest savings account. The bank may provide an employee with financial impact information that details how much interest the employee's money could earn if a percentage of the employee's gross income is allocated to the high interest saving account associated with the bank. Thus, in one embodiment of the invention, the financial impact information may be used to cross-sell payroll settings that are provided by external entities. Those skilled in the art will appreciate that external entities that may cross-sell payroll settings via financial impact information are not limited to banks. For example, entities that provide college savings accounts for an employee's children may cross-sell such accounts to an employee via the financial impact information provided on payroll reports.

Figure 3:
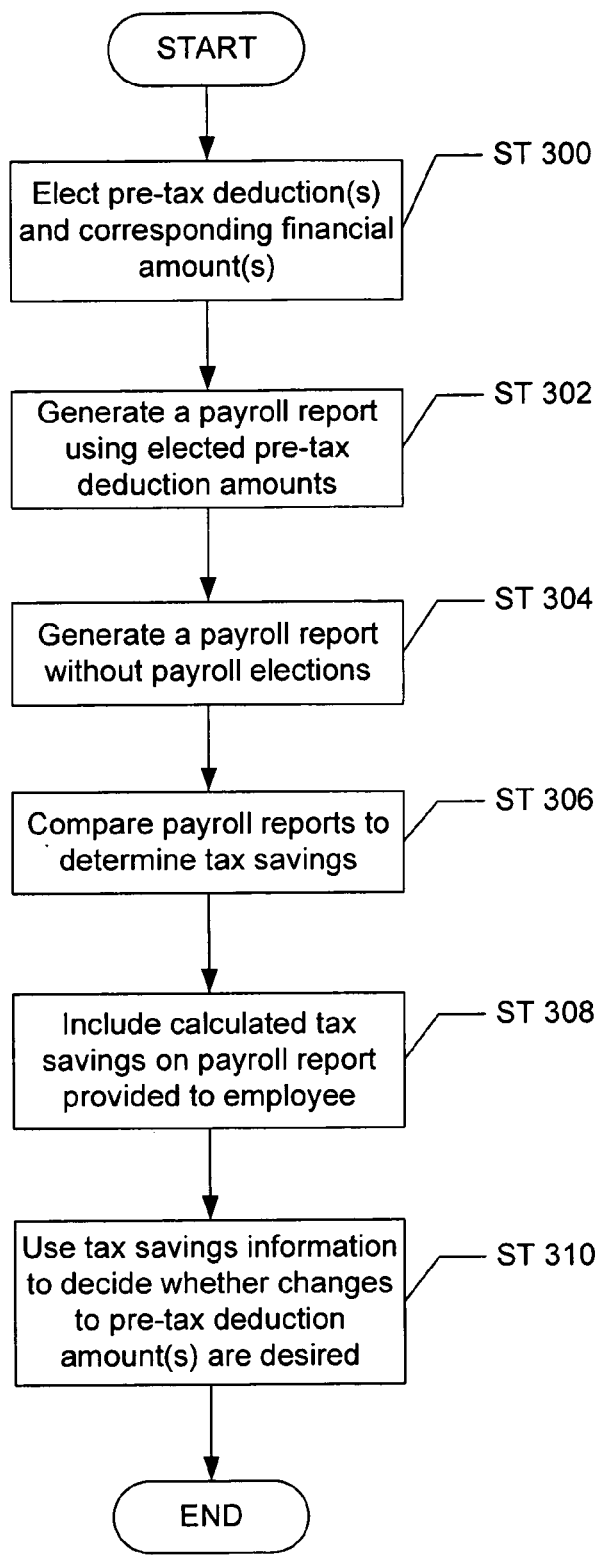
FIG. 3 shows a flow chart for calculating tax savings on an enhanced payroll report in accordance with one or more embodiments of the invention.

As mentioned above, in one embodiment of the invention, financial impact information may include tax savings information associated with pre-tax deductions elected by an employee. FIG. 3 shows a flow chart for generating a payroll report that includes such tax savings information in accordance with one embodiment of the invention.

Initially, one or more pre-tax deductions are elected and corresponding financial amounts associated with each pre-tax deduction are specified (Step 300). For example, pre-tax deductions may include one or more of the following: retirement contributions (e.g., 401k contributions), health care insurance benefits, healthcare savings benefits, disability benefits, dependant care benefits, etc. Subsequently, a payroll report that includes the elected pre-tax deduction(s) and financial amount(s) in the payroll data calculations is generated (Step 302). Thus, for example, if the payroll report is a pay stub associated with an employee's paycheck, then the pay stub would include the pre-tax deduction amount subtracted from the employee's gross income before taxes are applied to the employee's gross income to arrive at the employee's net income. Then, another payroll report that includes different settings is run. Specifically, another payroll report that does not consider the pre-tax deduction amounts when computing payroll data calculations is generated (Step 304).

At this stage, the two generated payroll reports are compared to determine the tax savings for each type of tax paid by an employee (Step 306). For example, tax savings may include savings on federal income tax, state income tax, disability tax, and other state/local taxes that may be deducted from the employee's income. By comparing the two generated payroll reports, the difference between the tax amounts that is applied to the employee's income may be used to calculate the amount of tax savings that the employee received. Subsequently, the calculated tax savings are included on a final payroll report that is provided to an employee (Step 308). Further, the tax savings amount may be provided on the payroll report in multiple forms. For example, the tax savings amount may be calculated and provided in a year-to-date amount or a current pay period amount. Finally, the tax savings information is used by an employee to decide whether changes to the pre-tax deduction election(s) or financial amount(s) are desired (Step 310). For example, based on the tax savings information, an employee may decide to contribute more/less to retirement benefits to increase the tax savings enjoyed by the employee or to receive more cash per paycheck.

Continuing with the pre-tax deduction example, FIG. 4 shows an example payroll report that includes such tax savings information in accordance with one embodiment of the invention. More specifically, in the example of FIG. 4, the payroll report is a pay stub (400) associated with an employee paycheck. The pay stub (400) includes compensation (402), pre-tax deductions (404), employee paid taxes (406), net pay (408), company paid taxes (410), and financial impact information that includes tax savings (412) associated with the elected pre-tax deductions (404). The pre-tax deductions (404) shown in the example of FIG. 4 include a retirement (401k) contribution and a medical care contribution.

Further, in one embodiment of the invention, the tax savings (412) shows an employee the amount of money an employee saved in taxes as a direct result of the pre-tax deductions (404) that the employee elected. Thus, the employee associated with the pay stub (400) saved $9.93 total dollars in tax payments because the employee's taxable income was reduced by the elected pre-tax deductions (404).

Those skilled in the art will also appreciate that the tax savings information may be presented in various ways on a payroll report. For example, the tax savings (412) shown in FIG. 4 could be compared to the total pre-tax deduction contribution to provide an employee with an out-of-pocket amount for pre-tax deduction contributions. For example, using the financial amounts shown in FIG. 4, the pay stub may display the tax savings information by explaining to the employee that although the employee contributed $70.00 total in pre-tax deductions for the pay period shown, the total out-of-pocket cost to the employee was only $60.07.

Those skilled in the art will appreciate that FIGS. 3 and 4 illustrate one example of calculating financial impact information associated with a particular type of line item on a paycheck for display on a payroll report and are not meant to limit the invention in any way. Further, those skilled in the art will appreciate that the process shown in FIG. 3 shows one method for calculating the tax savings impact of pre-tax deduction elections made by an employee. Other methods for calculating such tax savings information may also exist. For example, the payroll engine may include equations for calculating the tax savings information associated with pre-tax deductions so that multiple payroll report may not need to be generated by the payroll report generator.

Further, in one or more embodiments of the invention, financial impact information related to pre-tax deductions may be presented in other ways. For example, a payroll report may include the calendar year limit on 401k contributions, and using an employee's current 401k contribution amount, the payroll engine may calculate how close the employee will be to the calendar year limit by the end of the calendar year. This information may be subsequently displayed on payroll reports generated for the employee, including recommendations for reducing/increasing the contribution amount to comply with the calendar year limit. In another embodiment of the invention, a link to the employer's 401k provider may be included as financial impact information, so that the employee can use the link to access further information associated with the employee's 401k account.

In an alternate scenario, financial impact information related to pre-tax deductions may be presented as recommendations for changing the pre-tax deduction amounts selected by an employee. For example, suppose an employee has elected to contribute 6% of the employee's gross income to 401k retirement benefits. In this case, financial impact information may include a recommendation to change the contribution amount to 10% of the gross income, along with the figures for how much the employee's pre-tax savings amount would increase based on the increase in the 401k contribution (e.g., for an additional cost of $X, you can save $Y dollars in additional tax savings). Further, similar financial impact information may be provided with other pre-tax deduction options, such as health care accounts, dependant care accounts, disability benefits, etc.

Further, because an employer that provides such financial impact information does not have to actually perform the calculations required to display the financial impact information, employers can use the financial impact information to induce employees to participate in certain payroll settings that benefit the employer. For example, an employer may want lower income employees to contribute to 401k benefits. In this case, the financial impact information may include the eligibility requirements for the employer's 401k plan, and provide helpful financial information on the tax savings and/or other positive impact that contributing to the employer's 401k plan would provide to the employee.

Figure 5:
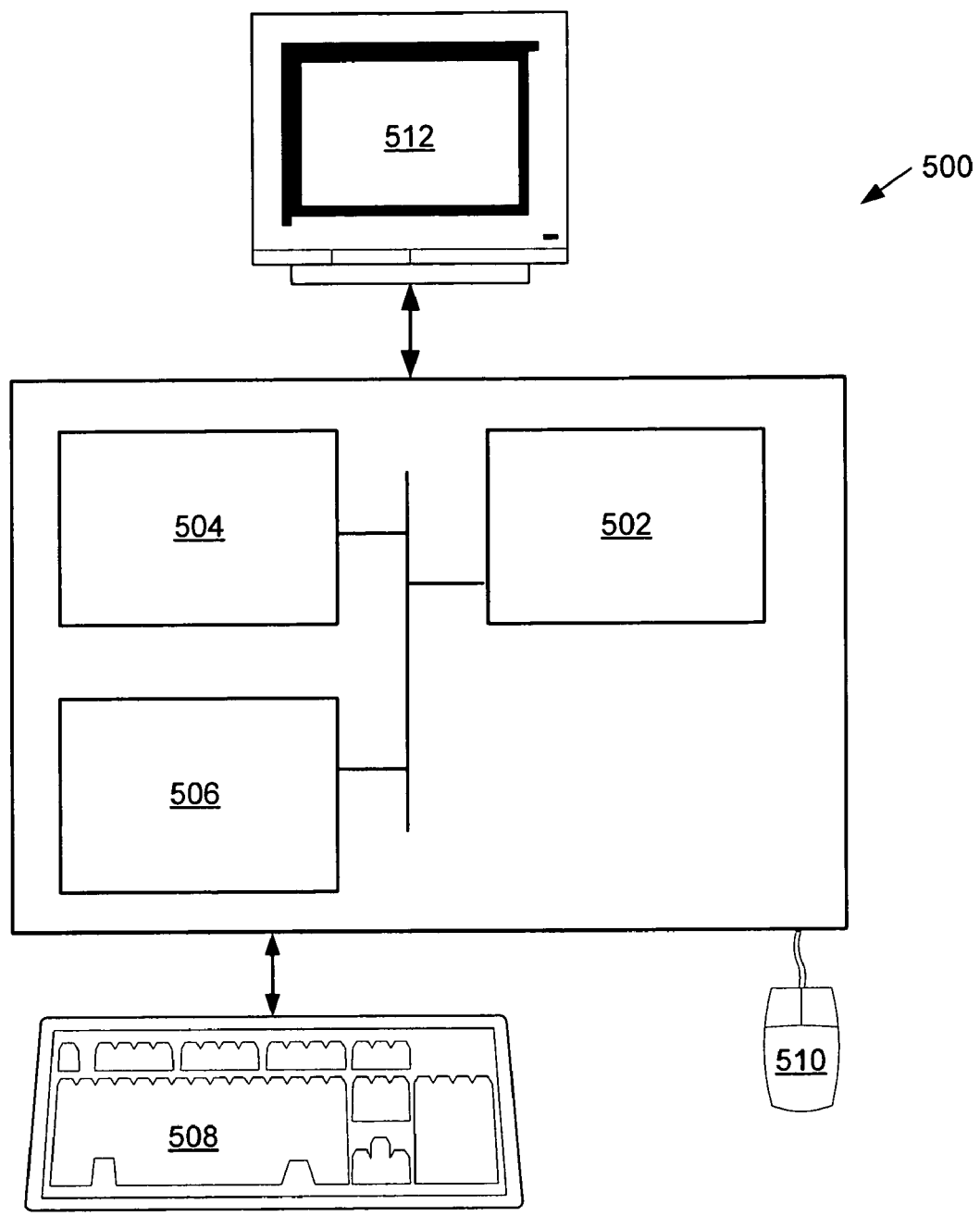
FIG. 5 shows a computer system in accordance with one embodiment of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system (500)

may be located at a remote location and connected to the other elements over a network. Further, software instructions to perform embodiments of the invention may be stored on a computer readable medium such as a compact disc (CD), a diskette, a tape, a file, or any other computer readable storage device now known or later developed.

Embodiments of the invention provide a method and system for educating an employee regarding the financial impact that paycheck line items have on an employee's financial state. Said another way, embodiments of the invention provide an enhanced payroll report that includes more than just paycheck line item descriptions and financial amounts associated with each paycheck line item. Specifically, embodiments of the invention provide financial impact information on payroll reports, where the financial impact information allows employees to understand the immediate financial impact of each paycheck line item and reinforce employee confidence in payroll elections selected. The financial impact information provides alternate scenarios for an employee to change the affect that particular payroll settings have on the line items of the employee's paycheck. Thus, an employee does not have to make financial decisions that may impact line items on their paychecks independent of their paychecks because the financial impact information may be included directly on payroll reports provided to the employee, such as on pay stubs associated with the employee's paychecks. Further, financial impact information is used by the employee to determine whether to change selected payroll elections, manage cash flow, and/or modify settings associated with line items on the employee's paycheck.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for creating a payroll report, comprising: setting a payroll election in a payroll system; obtaining a line item on a paycheck, wherein the line item is a result of setting the payroll election;
    calculating, using a processor, a first tax liability using a first calculation involving the line item;
    calculating, using the processor, a second tax liability using a second calculation excluding the line item;
    comparing the first tax liability and the second tax liability to determine a tax savings for a current pay period attributable to the line item;
    changing the payroll election in the payroll system based on the tax savings; and
    generating, using the processor, the payroll report for the current pay period for an employee comprising the tax savings, wherein the payroll report is provided to the employee for the current pay period.

2. The method of claim 1, further comprising:
    using the tax savings to determine whether to change payroll settings associated with the line item.

3. The method of claim 1, further comprising: changing the payroll election to manage cash flow.

4. The method of claim 1, wherein the payroll report further comprises a pay stub associated with the paycheck issued by an employer.

5. The method of claim 1, wherein the line item comprises a pre-tax deduction.

6. The method of claim 5, wherein the pre-tax deduction is a health insurance premium.

7. The method of claim 5, wherein the pre-tax deduction comprises retirement contributions.

8. The method of claim 1, wherein the payroll report comprises recommendations for changing elected payroll settings.

9. The method of claim 1, wherein the payroll report further comprises a link to an external entity selling a financial service.

10. The method of claim 9, wherein the financial service is educational fund management.

11. A system for generating a payroll report, comprising:
    a payroll data input unit configured to:
    set a payroll election in a payroll system; and obtain a line item of a paycheck of an employee, wherein the line item is a result of setting the payroll election; and
    a payroll report generator operatively connected to the payroll data input unit configured to: calculate a first tax liability using a first calculation involving the line item; calculate a second tax liability using a second calculation excluding the line item; compare the first tax liability and the second tax liability to determine a tax savings for a current pay period attributable to the line item; change the payroll election in the payroll system based on the tax savings; and generate the payroll report for the current pay period for an employee comprising the tax savings for the current pay period, wherein the payroll report generator comprises a payroll engine configured to perform the calculations, and wherein the payroll report is provided to the employee.

12. The system of claim 11, further comprising:
    a payroll report output unit operatively connected to the payroll report generator and configured to display the payroll report.

13. The system of claim 11, wherein the payroll report comprises a comparison between the line item and a calendar year limit associated with the line item.

14. The system of claim 11, wherein the payroll report comprises a pay stub associated with the paycheck.

15. The system of claim 11, wherein the line item comprises a pre-tax deduction.

16. The system of claim 11, wherein the payroll report comprises recommendations for changing elected payroll settings.

17. The system of claim 11, wherein the payroll report further comprises a link to an external entity selling a financial service.

18. The system of claim 17, wherein the financial service is educational fund management.

19. A computer readable medium storing instructions to create a payroll report, the instructions executable on a processor and comprising functionality to: set a payroll election in a payroll system; obtain a line item on a paycheck, wherein the line item is a result of setting the payroll election;
    calculate a first tax liability using a first calculation involving the line item; calculate a second tax liability using a second calculation excluding the line item; compare the first tax liability and the second tax liability to determine a tax savings for a current pay period attributable to the line item;
    change the payroll election in the payroll system based on the tax savings; and
    generate the payroll report for the current pay period for an employee comprising the tax savings, wherein the payroll report is provided to the employee for the current pay period.

20. The computer readable medium of claim 19, wherein the payroll report comprises a pay stub associated with the paycheck.

21. The computer readable medium of claim 19, wherein the line item comprises a pre-tax deduction.

22. The computer readable medium of claim 21, wherein the pre-tax deduction is a health insurance premium.

23. The computer readable medium of claim 19, wherein the payroll report further comprises a link to an external entity selling a financial service.

24. The computer readable medium of claim 23, wherein the financial service is educational fund management.

* * * * *